Jan. 16, 1951   R. I. ANDERSON   2,537,952
OBJECT LOCATING SYSTEM
Filed Jan. 14, 1944   2 Sheets-Sheet 1

INVENTOR
ROBERT I. ANDERSON
BY Paul B. Hunter,
ATTORNEY

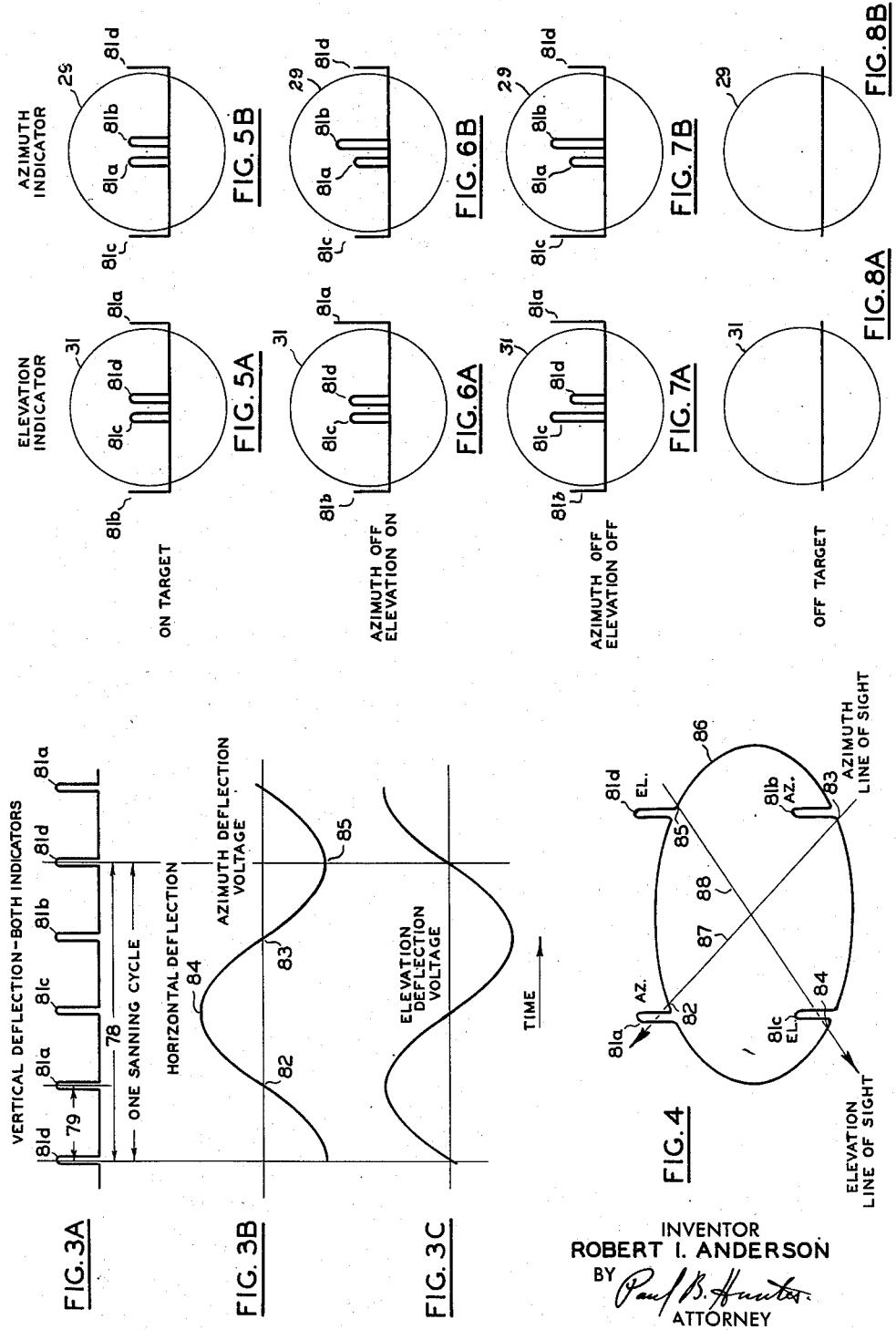

Patented Jan. 16, 1951

2,537,952

UNITED STATES PATENT OFFICE 2,537,952

OBJECT LOCATING SYSTEM

Robert I. Anderson, Alameda, Calif., assignor to The Sperry Corporation, a corporation of Delaware Application January 14, 1944, Serial No. 518,277

9 Claims. (Cl. 343—16)

My invention relates to object locating systems and concerns, particularly, indicating systems therefor.

An object of my invention is to provide improved methods and apparatus for indication of angular position or of angular deviation from a reference direction of a target or other object to be located.

Another object of the invention is to provide an arrangement in which no indications are produced when the apparatus is pointed away from the target, or when no target is present, and in which the condition of exact alignment on a target may be distinguished from the absence of any target, or the failure of any input signal to be received by the apparatus.

A further object of the invention is to provide an arrangement for indicating the angle of deviation by matching of received pulses.

Still another object of the invention is to provide for separation of azimuth and elevation indicating pulses.

Still another object of the invention is to provide an arrangement for the indication of phenomena of a recurrent nature by an oscilloscope having a sub-synchronous time sweep.

Other and further objects and advantages will become apparent as the description proceeds.

In carrying out my invention in its preferred form I utilize a pulsed microwave transmitter with a receiver appropriate thereto, and means for rotating the beam or radiation pattern over which the microwave energy is transmitted and received for the purpose of making manifest the presence of a target or an object to be located by the reflection of signals from such an object. I provide apparatus responsive to the relative strengths of signals reflected from either side of the beam-rotation axis for the purpose of indicating the angular deviation of the object from the axis about which the radiation pattern or beam is being rotated. In order to produce a single pulse in each quadrant of the space in which the microwave beam is being rotated, the repetition rate of the pulse transmitter is made four times the angular speed of revolution of the microwave beam. Separate azimuth and elevation indicators are provided which may be of the cathode ray oscilloscope type, and these are provided with a sweep voltage synchronous with the speed of rotation of the microwave beam and therefore sub-synchronous with respect to the received pulses. The received pulses are applied to the signal deflection circuits of the indicators and the time sweep circuits thereof are supplied with sine waves which are in quadrature so that one indicator produces a pair of pulses which match when the center line of the apparatus or axis of rotation of the microwave beam is directed toward the target in azimuth and the other indicator produces pulses which are matched when the axis of rotation is directed toward the target in elevation.

A better understanding of the invention will be afforded by the following detailed description considered in connection with the accompanying drawings in which:

Figs. 3A, 3B and 3C are graphs illustrating a phase relationship between the received pulses and the oscilloscope deflection voltages;

Figure 1:
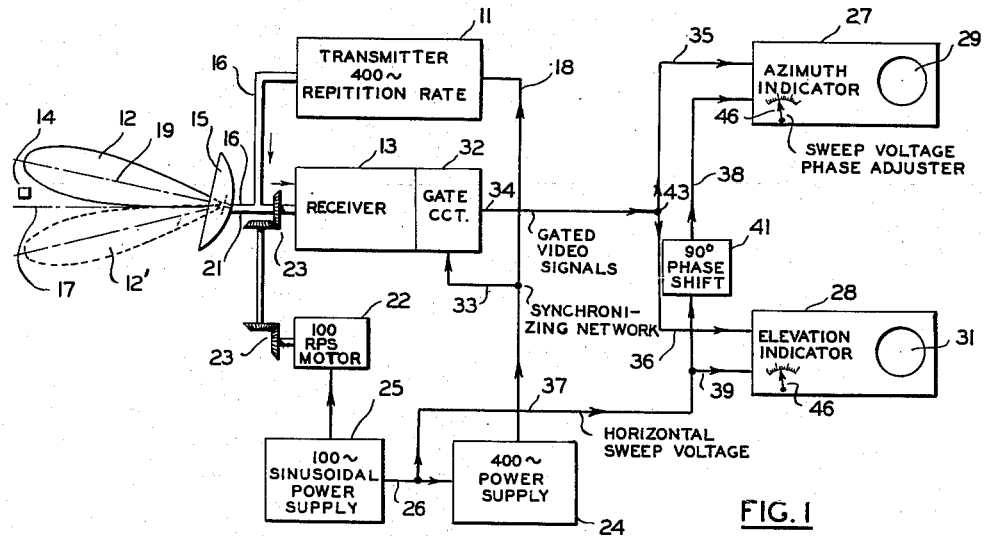
Fig. 1 is a schematic block diagram of one embodiment of my invention.

Fig. 4 is a "perspective" diagram illustrating the manner in which matching pulses are obtained on the oscilloscope screen, elevation pulses are eliminated from the azimuth screen and azimuth pulses are eliminated from the elevation screen; and Figs. 5A and 5B to 8A and 8B are diagrams illustrating the appearance of the oscilloscope screen and the hypothetical positions beyond the screen of the pulses actually eliminated from the oscilloscope screen under various conditions of angular deviation of a target.

Like reference characters are utilized throughout the drawings to designate like parts.

As in apparatus heretofore known, the apparatus illustrated in Fig. 1 includes a pulse microwave transmitter 11 for projecting a beam 12 of microwave radiant energy, and a receiver 13 of the vacuum-tube type, e. g., for responding to reflections of such pulses in case the microwave beam 12 should be intercepted by a target 14 causing reflection of the projected microwave energy. As in apparatus heretofore known, I may also employ a radiator 15 of the dipole and parabolic reflector type which is common to the transmitter 11 and the receiver 13 with suitable means (not shown) for preventing direct transfer of energy from the transmitter 11 to the receiver 13.

As in apparatus heretofore known, the frequency of the transmitter 11 may be such as to make desirable the use of transmission lines 16 of the hollow pipe wave guide type for connecting the transmitter 11 and the receiver 13 to the radiator 15.

In distinction from such previously known apparatus the illustrated apparatus includes means for rotating the radiation pattern 12 of the transmitter 11 and receiver 13 about an axis of rotation 17 together with means 18 for synchronizing the transmitter 11 and gating the receiver 13 so as to cause a single pulse to be transmitted and received after the radiation pattern 12 has executed each predetermined fraction, e. g., each quarter revolution about the axis 17. Any desired means may be provided for effectively causing the rotation of the radiation pattern 12 about the axis 17. For simplicity in the drawing it is assumed that this is accomplished by mounting the radiator 15 so that the beam center line 19 is slightly oblique with respect to the axis of rotation 17 and by providing means such as a rotatable hollow shaft 21 driven by a synchronous motor 22 through gearing 23 for physically rotating the radiator 15.

It will be understood, however, that it may be more convenient to rotate only a portion of the radiator 15, or provide other means for causing rotation of the radiation pattern 12 without actual rotation of the entire radiator 15.

Although my invention is not limited to the use of a particular radio frequency or particular repetition rate of pulses, I have found that satisfactory results may be obtained when the microwave energy has a wavelength of 3 to 10 centimeters by utilizing a repetition rate of 400 cycles per second, for example. When such a repetition rate is desired a 400-cycle power supply 24 may be provided with a synchronizing connection 18 to the transmitter 11, for causing the transmitter 11 to produce a train of microwaves having a relatively short duration such as one-half microsecond, for example, every 2500 microseconds.

For synchronizing the pulse repetition rate with the angular speed of revolution of the radiation pattern 12, the motor 22 may be a synchronous motor and a 100-cycle power supply 25 may be provided having a synchronizing connection 26 between it and the 400-cycle power supply 24. Since the means for synchronizing the 400-cycle power supply with the 100-cycle power supply is not a part of my invention it need not be illustrated or described in detail herein. A suitable synchronizing arrangement is described in the copending application of Walter Dean, Serial No. 499,213, filed August 19, 1943, now U. S. Patent No. 2,435,958, issued February 17, 1948, and is assigned to the same assignee as the present application.

In order that angular indications of the position of the object 14 with respect to the axis 17 may be produced with separate indications in azimuth and elevation, a pair of indicators 27 and 28 is provided. These indicators contain suitable control circuits, to be described hereinafter, and cathode ray oscilloscope tubes having indicating screens 29 and 31, respectively.

To permit selection of only the desired signal, a gate circuit 32 is preferably provided, which supplies sensitivity gates or voltage pulses to the receiver 13 which are synchronized with the repetition rate of the transmitter 11. It will be understood that the receiver 13 may be of a known type in which control of voltage at a suitable point such as a screen grid or cathode terminal controls the sensitivity. As indicated schematically a synchronizing connection 33 is provided between the gate circuit 32 and the synchronizing line 18 to the transmitter 11.

It will be understood, however, that the representation of synchronizing means in the drawing is only schematic and that any suitable known means or arrangement for synchronizing the gate circuit and the pulse repetition rate may be employed.

The receiver 13 is provided with an output connection or channel 34 at which gated video signals appear, and branch connections 35 and 36 from the channel 34 are made to the vertical deflection circuits of the azimuth indicator 27 and the elevation indicator 28.

In order that indicators 27 and 28 may be provided with a sinusoidally varying horizontal or time sweep voltage, the power supply 25 is preferably such as to produce a sinusoidal voltage. An output connection 37 from the power supply 25 is branched to form lines 38 and 39 connected to the horizontal sweep circuits of the indicators 27 and 28, respectively. Suitable means are provided for introducing a quadrature relationship between the voltages supplied over the lines 38 and 39. For example, a phase shifter 41 may be interposed in one of these lines; however, it will be understood that if a quarter phase power supply is utilized, separate connections from the phases may be made to the lines 38 and 39, thus obviating the need for any separate phase shifter.

Since the diagram of Fig. 1 is only schematic it is to be understood that my invention is not limited to the details of the schematically indicated means for interconnecting, phasing or synchronizing the various elements shown in the diagram.

Since the azimuth and elevation indicators 27 and 28 may be substantially identical, only one of them need be described. In the form represented in the circuit diagram of Fig. 2, each indicator comprises a cathode ray tube 42, a pair of 100-cycle input terminals, viz., the sweep wave input terminals 38, a pair of video signal input terminals 35, a source of unidirectional voltage having positive and negative terminals 44 and 45, respectively, an adjustable phase shifter 46 for adjusting the proximity of indicated pulses, and a suitable means for adjusting and selecting various voltages to be applied to the tube 42.

The tube 42 may be of substantially conventional form having an anode 47, an indirectly heated cathode 48, suitable control electrodes such as a focusing electrode 49, an intensity-control grid 51, and suitable beam deflection means. As illustrated, the beam deflection means takes the form of a pair of electrostatic deflection plates 52 and 53 for producing a vertical deflection, and a second pair of electrostatic deflection plates 54 and 55 for producing horizontal deflections.

It will be understood that the tube 42 is of the type in which a cathode ray beam (not shown) is emitted by the cathode 48, and strikes a point on the screen 29, determined by the potentials on the electrostatic deflection plates 52 to 55.

For providing voltages of suitable potential and for adjustability of certain of these voltages, a potentiometer 56 may be provided comprising a resistance connected between the D. C. input terminals 44 and 45 with an intermediate point 57 grounded.

For adjusting the beam intensity an adjustable tap 56' may be provided on the potentiometer 56, and may be connected to the intensity-control grid 51, and for beam focusing an adjustable tap 59 may be provided on the potentiometer 56 and connected to the focusing electrode 49. The cathode 48 is connected to a terminal 60 near the negative end of the potentiometer 56.

For beam centering a pair of centering potentiometers 61 and 62 may be connected between the positive terminal 44 of the D. C. power supply source, and a terminal 63 thereof which is on the negative side of the ground terminal 57. The potentiometer 61 is provided with a tap 65 connected to one of the vertical plates 52 for vertical centering, and the potentiometer 62 is provided with an adjustable tap 66 connected to one of the horizontal deflection plates 54 for horizontal centering. Preferably by-pass condensers 67 are connected between the centering taps 65 and 66 and the ground connection.

The remaining vertical deflection plate 53 may be grounded to the anode 47, whereas the remaining horizontal deflection plate 55 is grounded through a resistor 68.

The sweep wave terminals 38 are coupled to the horizontal deflection plates 54 and 55 through the adjustable phase shifter 46. As shown, the phase shifter 46 may comprise a transformer 69, having a secondary winding 71 coupled to the deflection plates 54 and 55 and having a tapped primary winding 72. The entire winding 72 is connected in series with a phase-splitting condenser 73 and a phase-adjusting rheostat 74. A portion 75 of the winding 72 is connected in series with the rheostat 74 to the sweep-wave input terminals 38.

The video signal input terminals 35 are coupled to the ungrounded vertical deflecting plate 52 through a coupling condenser 77.

As the radiation pattern 12 of the radiator 15 of Fig. 1 is rotated by the motor 22, its axis of symmetry 19 describes a cone of revolution and the beam 12 rotates between two extreme positions in any one plane. If the horizontal be regarded as the plane of the paper, for the sake of illustration, the full line of representation of the beam 12 is assumed to be the extreme right-hand position; and the extreme left-hand position is represented by a pattern 12' shown in dotted lines.

The synchronizing connections 18 and 26 are so adjusted, with respect to the physical position of the stator of the motor 22, that pulses are produced by the transmitter 11 when the beam 12 is in the upper and lower positions. Accordingly, pulses will also be produced when the beam is in the two positions at 90 degrees from the upper and lower positions, that is to say, in the extreme right and extreme left positions.

Referring to Fig. 3A, it will be observed that one complete scanning cycle 78, that is, the time for the radiation pattern 12 to make a complete revolution about its axis of revolution 17, is four times the time interval 79 between the received pulses which are represented in Fig. 3A by curves 81a, b, c, d, collectively referred to hereinafter by the reference numeral 81.

The curves 81 represent the shape of the video signal output of the receiver 13 with voltage measured in a vertical direction in the graph of Fig. 3A, and time duration measured in the horizontal direction.

The sweep wave voltages applied to the sweep wave circuits of the azimuth indicator 27 and the elevation indicator 28 are shown in Figs. 3B and 3C, respectively. As shown, the azimuth voltage 3B lags approximately 90 degrees behind the elevation voltage 3C, and the phase relationships are so adjusted, such as by phase shifter 46 (Fig. 2), that the maximum points and zero points of the deflection voltage waves of Figs. 3B and 3C correspond very nearly but not exactly to the instants at which the received pulses occur.

Referring to Figs. 3A, 3B and 3C, it will be observed that video signals, or received pulses 81 occur twice for each cycle during the approximate times of zero voltage of either sweep wave and likewise such video pulses occur twice during the approximate times of maximum voltage of a sweep wave. However, the video received pulses always have positive polarity whether the sweep voltage is positive or negative.

Considering first the azimuth indication with reference to Figs. 3A, 3B and 5B, if video pulses occurred exactly at the instants 82 and 83 of zero sweep voltage the video pulses produced on the screen at the center would be superimposed. However, the phase adjustment is altered slightly so that the two signals 81a and 81b at the center of the screen are separated, one with slightly negative sweep voltage, the other with slightly positive sweep voltage. For distinguishing the video pulses corresponding to the four different angular positions of the microwave beam 12, the letters a, b, c and d are added to the reference numeral 81.

Figure 2:
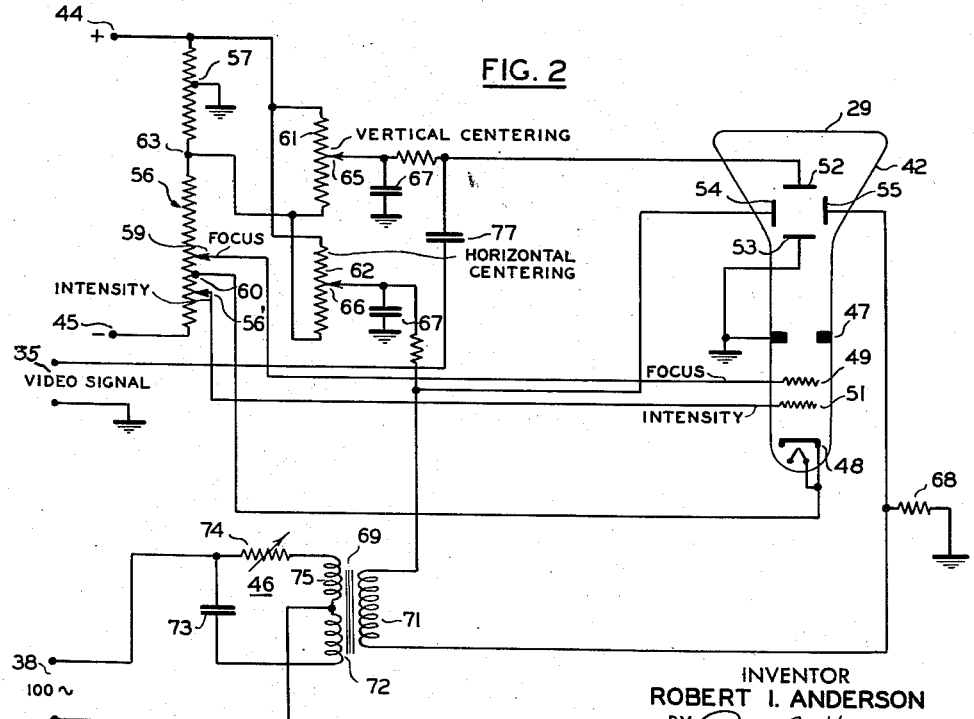
Fig. 2 is an electric circuit diagram of one of the indicators represented in Fig. 1.

The requisite slight dephasing of the azimuth deflection voltage of Fig. 3B, with respect to the radio signals 81 of Fig. 3A, may be accomplished by suitable adjustment of the phase shifter 46 of Fig. 2.

It will be understood that for clarity in the drawing the spacing between the pulses 81a and 81b in Fig. 5B is exaggerated. The magnitude of the azimuth deflection voltage of Fig. 3B is made great enough to sweep the beam of the tube 42 beyond the edges of the screen 29.

Since there are four video signals, or received pulses 81, for each cycle of the sweep voltage, two of the pulses will appear on screen 29 near the center when the sweep voltage is substantially zero, and the other two pulses will occur when the cathode ray beam is swept beyond the screen 29 to the extreme left and to the extreme right by the maximum positive and negative peak values of the sweep voltage indicated at 84 and 85 in Fig. 3B. The hypothetical positions relative to screen 29 of these side pulses which do not appear on the screen are indicated by the vertical lines 81c and 81d in Fig. 5B. The relationship between the positions on or relative to the screen 29 and the times of occurrences of the pulses 81a, 81b, 81c and 81d, is represented by the perspective diagram of Fig. 4. Actually the beam is swept back and forth along a straight line on the screen 29 by the sweep voltage when the signal voltage or voltage on the vertical deflection plates 52 and 53 is zero, or constant. However, for the sake of illustration, the sweep path is represented in Fig. 4 by an ellipse 86. In looking in the direction of the arrow along an azimuth line of sight 87, the azimuth indicating pulses 81a and 81b will appear nearly superimposed, whereas two elevation indicating pulses 81c and 81d appear to the extreme left and to the extreme right.

The relative heights of the azimuth pulses 81a and 81b serve as an indication of the angular deviation of the target 14 (Fig. 1) from the beam axis of rotation 17. If, as indicated in Fig. 1, the target 14 is to the right of the axis of rotation 17, a stronger reflected pulse will be received when the beam axis 19 is at the extreme right than when the beam axis is at the extreme left. Accordingly, one of the video signals at the center of the screen, preferably the right-hand signal 81b, appears stronger than the left-hand signal 81a. An indication representing this condition is illustrated in Fig. 6B.

It will be understood that the adjustment of the phase shifter 46, of Fig. 2, determines which pulse is to the right and which to the left, but preferably the adjustment is so made that the stronger pulse appears on the right when the target is on the right of the beam axis of rotation 17.

Referring to Figs. 3A, 3C and 5A, it will be apparent that a similar action takes place with respect to the pulses 81c and 81d, indicating elevation. Thus, when the axis of rotation 17 of the microwave beam lies in a horizontal plane passing through the target 14, signals of equal strength will be received in the receiver 13 when the beam axis 19 is in its uppermost and lowermost positions, causing the pulses 81c and 81d appearing at the center of the screen 31 of the elevation indicator to have equal height. In this case the azimuth indicating pulses 81a and 81b will occur when the cathode ray beam is beyond the limits of the screen 31 and will not appear on the screen although the hypothetical positions are indicated in Fig. 5A.

Figs. 6B and 6A represent the indications obtained in the screens 29 and 31 of the indicators 27 and 28 when the beam axis of rotation 17 is properly centered with respect to the object 14 in elevation, but not in azimuth.

Figs. 7A and 7B represent the indications produced when the target 14 deviates from the axis of rotation 17, both with respect to azimuth and elevation.

Referring to the perspective diagram Fig. 4, assuming that the elevation line of sight 88 is in the direction of the arrow, it will be observed that by slight dephasing of the elevation sweep voltage of Fig. 3C, the elevation pulses 81c and 81d are caused to appear slightly to the left and right, respectively, of the center of the elevation screen. A "range gate" may be used so that only targets within a predetermined band in range will be presented to the indicators.

The indicating system illustrated serves not only to indicate the deviation of the beam axis of rotation 17 with respect to the direction of the target 14, but also indicates whether or not any target is present within the area swept by the revolving beam 12. For example, if no target is present so that no signals are received by receiver 13, because no microwaves are reflected, both indicators will have their screens blank as indicated in Figs. 8A and 8B. The presence of two balanced signals or pulses on the screens 29 and 31, when the beam axis of rotation 17 is exactly on the target, and the absence of any indications on the screen when there is no target, enables the operator of the apparatus to detect the absence of a target immediately instead of being confused by what might appear to be a centered indication if a continuously present deflectible spot or pointer were employed to indicate angular deviation of a target from a dead-ahead direction.

It will be understood that apparatus such as illustrated in the drawings may be employed either for indicating the deviation of a target from a fixed line of sight, or for enabling the entire apparatus to be realigned to point toward the target in case the axis of rotation 17 is made adjustable in direction by a suitably pivoted mounting arrangement for the apparatus.

In accordance with the provisions of the patent statutes, I have described the principle of operation of my invention together with the apparatus which I now believe to represent the best embodiment thereof, but desire to have it understood that the apparatus shown and described is only illustrative and that my invention may be carried out by other arrangements.

What is claimed is:

1. An object locating system, comprising in combination means for projecting and receiving microwave beams on a rotatable radiation pattern, means for pulsing the beams at a frequency which is a multiple of the speed of rotation of the radiation pattern, and a two-dimensional indicator with means for deflecting a trace in one dimension in response to received pulses and, a sine wave generator for continuously sweeping said trace in the other dimension at a frequency corresponding to the speed of rotation of the beam radiation pattern, whereby pulses corresponding to different angular positions of the radiation pattern may be indicated in proximity but with pulses corresponding to other positions of the radiation pattern separated from said first-mentioned pulses.

2. Apparatus as in claim 1 with a sweep of sufficient amplitude to eliminate all of the indicated pulses except the first indicated pair of pulses.

3. An object locating system, comprising in combination means for projecting and receiving a rotatable microwave beam, means for pulsing the beam with a repetition rate four times the speed of rotation of the beam, and a two-dimensional indicator with means for deflecting a trace in one dimension in response to received pulses and means for deflecting the said trace in the other dimension at a sweep rate equal to the rotational speed of the beam, whereby four signal pulses are applied to said indicator for each sweep cycle, two of the pulses produced when the beam is in extreme opposite angular positions being indicated in proximity, and the other two pulses of the sweep cycle being separated from the first two.

4. An object locating system, comprising in combination means for projecting and receiving a rotating microwave beam, means for pulsing the beam at a repetition rate four times the speed of rotation of the beam, a two dimensional indicator with means for deflecting a trace in one dimension in response to received pulses, means for sweeping said trace back and forth in the other dimension at a sweep rate equalling the speed of rotation of the beam, and means for fixing the phase relationship between the trace sweep and the beam pulsing such that two alternate pulses in each sweep cycle occur at instants of nearly zero sweep, whereas the other two pulses of the sweep cycle referred to as side pulses occur at instants of maximum positive and negative sweep, whereby two of the pulses give adjacent nearly coincident indications in the center of the indicator.

5. Apparatus as in claim 4 in which the sweep magnitude is made sufficient to eliminate the side pulse indications.

6. An object locating system for indicating azimuth and elevation deviation from a reference direction, comprising means for transmitting and receiving a microwave beam, means for causing rotation of said beam around an axis serving as a reference direction, means for pulsing the beam at a repetition rate four times the speed of rotation of the beam, a pair of oscilloscope-type indicators for indicating azimuth and elevation deviation, respectively, each having deflection circuits for producing trace deflections in mutually transverse dimensions, means for suppling received pulses to one of the deflection circuits of each of said indicators, means for cyclically energizing the remaining deflection circuits of said indicators substantially in quadrature with a frequency equalling the speed of rotation of the beam to provide oscilloscope sweeps, and means for fixing the phase relationship between the pulses and oscilloscope sweeps so that alternate pulses occur when the sweep of one trace is very nearly but not exactly zero and when the sweep of the other trace is at positive or negative maximum value, whereby received pulses corresponding to two extreme angular positions of the rotating beam occur in the center of each indicator screen, and the other two pulses are swept to the side.

7. Apparatus as in claim 6, in which the sweep magnitude is made sufficient to sweep the side pulses beyond the oscilloscope screen to eliminate them from view.

8. Apparatus as in claim 6, in which phase shifters are provided in the sweep circuits for adjusting the spacing between center signals on the screen.

9. In combination, means for receiving pulsed radio signals, variable-directivity antenna means for varying the intensity of said received signals with a periodicity harmonically related to the periodicity of said signal pulses but such that successive signal pulses occur at different directivities of said antenna means, an oscilloscope with a pair of deflection circuits for producing trace deflections in transverse dimensions, connections for applying said received signal pulses to one of said deflection circuits, and a continuous sine wave sweep generator connected to the other of said deflection circuits and having a periodicity equal to that of said antenna means, whereby comparable indications corresponding to a plurality of said received signal pulses are produced by said oscilloscope.

ROBERT I. ANDERSON.

REFERENCES CITED

The following references are of record in the file of this patent:

UNITED STATES PATENTS

| Number | Name | Date |
| --- | --- | --- |
| 2,130,032 | Robins | Sept. 13, 1938 |
| 2,189,457 | Archer | Feb. 6, 1940 |
| 2,344,745 | Somers | Mar. 21, 1944 |
| 2,345,932 | Gould | Apr. 4, 1944 |
| 2,355,363 | Christaldi | Aug. 8, 1944 |
| 2,366,353 | Roberts | Jan. 2, 1945 |
| 2,402,168 | Lifschutz | June 18, 1946 |
| 2,403,429 | Anderson | July 9, 1946 |
| 2,422,361 | Miller | June 17, 1947 |